United States Patent
Helmick et al.

(10) Patent No.: US 8,767,343 B1
(45) Date of Patent: Jul. 1, 2014

(54) DISK DRIVE INCREASING INTEGRATOR OUTPUT RANGE TO COMPLETE SEEK OPERATION

(75) Inventors: Daniel L. Helmick, Broomfield, CO (US); Donald Brunnett, Pleasanton, CA (US); Aswartha Narayana, Aliso Viejo, CA (US); Duc T. Phan, Saratoga, CA (US)

(73) Assignee: Western Digital Technologies, Inc., Irvine, CA (US)

(*) Notice: Subject to any disclaimer, the term of this patent is extended or adjusted under 35 U.S.C. 154(b) by 144 days.

(21) Appl. No.: 13/454,752

(22) Filed: Apr. 24, 2012

(51) Int. Cl.
*G11B 5/596* (2006.01)

(52) U.S. Cl.
USPC .................. 360/78.04; 369/30.11; 369/30.16

(58) Field of Classification Search
USPC ......... 360/75, 78.05, 69, 78.06, 78.04, 78.12; 369/30.01–30.17, 44.28, 44.27, 44.29, 369/44.35
See application file for complete search history.

(56) References Cited

U.S. PATENT DOCUMENTS

| | | | |
|---|---|---|---|
| 4,189,747 A * | 2/1980 | Funari | 348/170 |
| 4,937,803 A * | 6/1990 | Nakane | 369/30.17 |
| 5,056,072 A * | 10/1991 | Wachi | 369/30.13 |
| 5,062,023 A | 10/1991 | Squire | |
| 5,136,441 A | 8/1992 | Kobayashi | |
| 5,602,692 A * | 2/1997 | Freitas et al. | 360/77.08 |
| 5,677,809 A | 10/1997 | Kadlec | |
| 6,122,135 A | 9/2000 | Stich | |
| 6,166,876 A | 12/2000 | Liu | |
| 6,476,998 B2 | 11/2002 | Cheung | |
| 6,754,024 B2 | 6/2004 | Suk et al. | |
| 7,253,989 B1 | 8/2007 | Lau et al. | |
| 7,667,922 B1 | 2/2010 | Nelson et al. | |
| 2002/0196574 A1 | 12/2002 | Suk et al. | |
| 2005/0002291 A1 | 1/2005 | Takeuchi | |
| 2006/0039079 A1* | 2/2006 | Kobayashi et al. | 360/78.05 |
| 2006/0092549 A1 | 5/2006 | Ishii et al. | |

* cited by examiner

*Primary Examiner* — Tan X Dinh

(57) ABSTRACT

A disk drive is disclosed comprising a disk comprising a plurality of data tracks, a head, and control circuitry comprising a servo control system operable to actuate the head over the disk. When an access command is received to access a target data track, a seek operation is initiated to seek the head toward the target data track, wherein the seek operation includes integrating a first state of the servo control system and limiting an output range of the integrating. The output range of the integrating is increased during the seek operation, for example, if an error occurs during the seek operation.

20 Claims, 6 Drawing Sheets

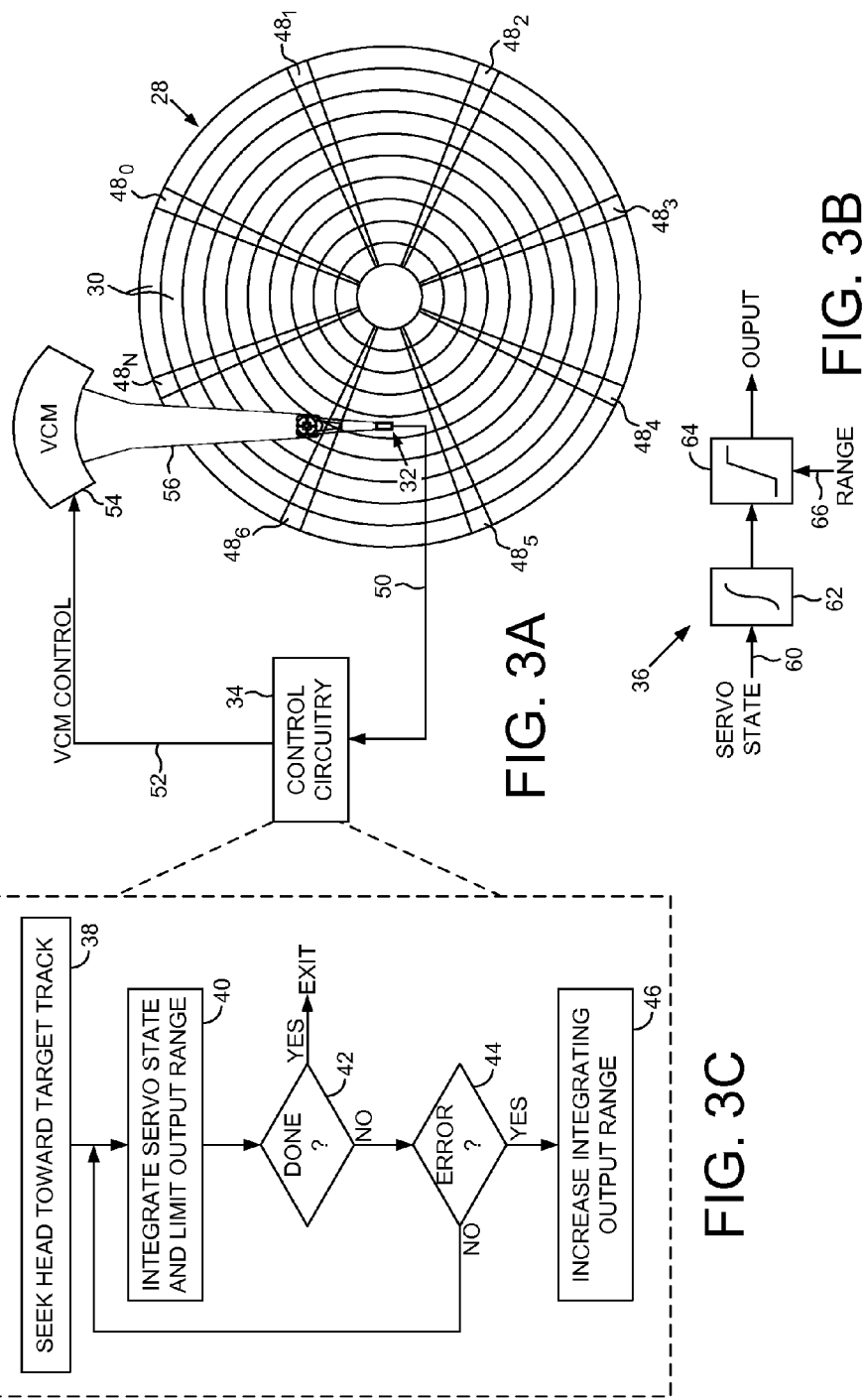

DISK DRIVE INCREASING INTEGRATOR OUTPUT RANGE TO COMPLETE SEEK OPERATION

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording data sectors and servo sectors. The servo sectors comprise head positioning information (e.g., a track address) which is read by the head and processed by a servo control system to control the position and velocity of the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol-synchronize to a servo data field 12. The servo data field 12 stores coarse head positioning information, such as a servo track address, used to position the head over a target data track during a seek operation. Each servo sector 4, further comprises groups of servo bursts 14 (A,B,C,D in the example shown), which are recorded with precise intervals and offsets relative to the track centerlines. The servo bursts 14 provide fine head position information used for centerline tracking while accessing a data track during write/read operations.

Control circuitry is typically mounted on a printed circuit board (PCB) that is fastened to the base of the disk drive. The head is connected to the control circuitry through a flex circuit fastened on one side to the PCB and fastened on the other side to the side of the actuator arm. The flex circuit may induce a bias force on the actuator arm in addition to other bias forces, such as bearing friction in the actuator arm pivot bearing, and windage affecting the actuator arm as the disk rotates. If the bias forces on the actuator arm are not compensated correctly, it may cause the settle mode at the end of a seek to fail. This is illustrated in the prior art flow diagram of FIG. 2A which is understood with reference to FIG. 2B. During an access operation (write or read), the control circuitry seeks the head toward a target track (block 16). When the head nears the target track, the control circuitry transitions into a settle mode (block 18) and attempts to settle the head onto the target track (block 20) as illustrated in FIG. 2B. If the seek operation successfully settles the head onto the target track, the seek operation exits normally (block 22). However, various factors may prevent the successful completion of the normal seek operation. For example, if the bias forces applied to the actuator arm are not accurately compensated, the normal seek operation may be unable to overcome these bias forces resulting in a time-out (block 24) as illustrated in FIG. 2B. When the normal seek operation times out (after one or more retry operations), the control circuitry will typically report an error to the host (block 26).

BRIEF DESCRIPTION OF THE DRAWINGS

FIG. 3A is a disk drive according to an embodiment of the present invention comprising a disk, a head, and control circuitry including a servo control system operable to actuate the head over the disk.

FIGS. 3B and 3C illustrate an embodiment of the present invention wherein during a seek operation an output range of an integrator may be increased if the seek operation does not complete successfully.

DETAILED DESCRIPTION

Figure 1:
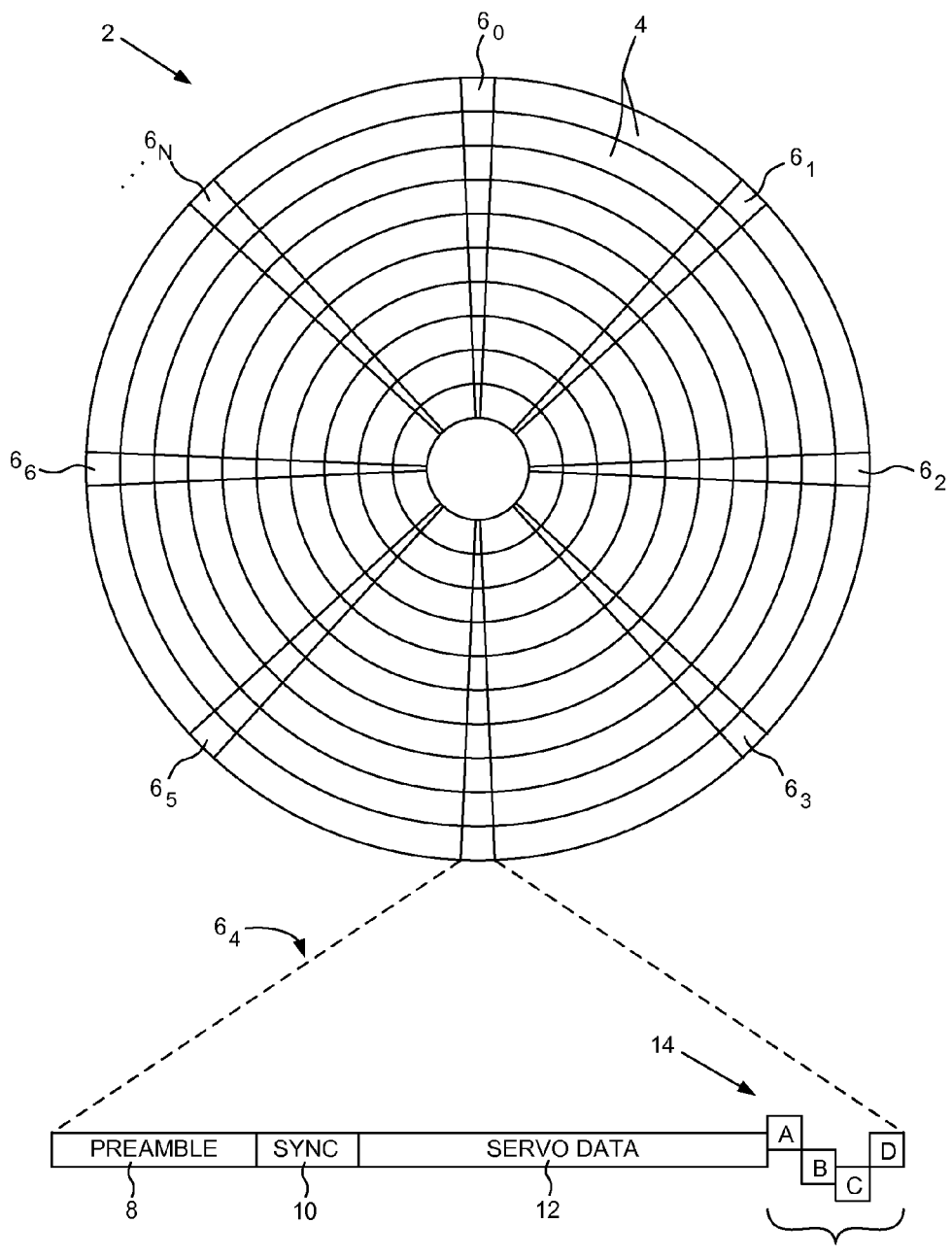
FIG. 1 shows a prior art disk format comprising a plurality of servo tracks defined by embedded servo sectors.
Figure 2A:
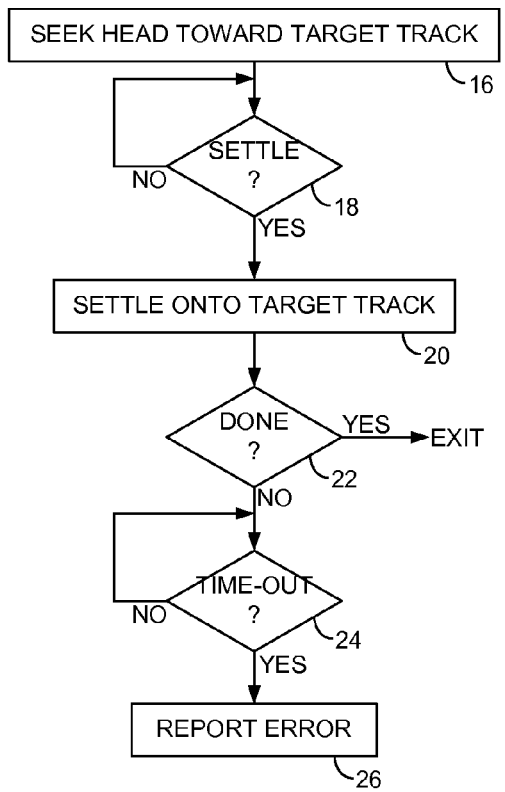
FIG. 2A is a prior art flow diagram wherein the disk drive reports an error to the host when a seek operation times out before completing successfully.
Figure 2B:
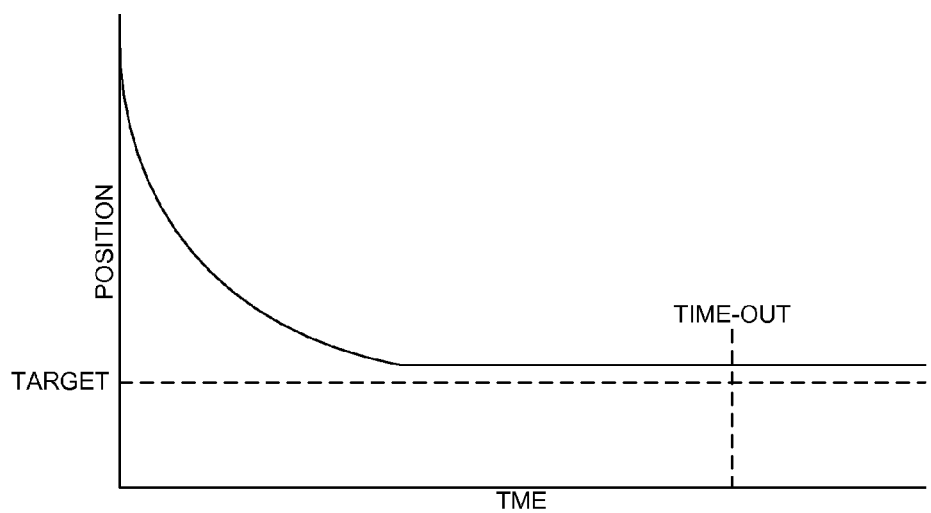
FIG. 2B illustrates a prior art example of the seek operation timing out before completing successfully.

FIG. 3A shows a disk drive according to an embodiment of the present invention comprising a disk 28 comprising a plurality of data tracks 30, a head 32, and control circuitry 34 comprising a servo control system 36 (FIG. 3B) operable to actuate the head 32 over the disk 28. The control circuitry 34 is operable to execute the flow diagram of FIG. 3C, wherein when an access command to access a target data track is received, a seek operation is initiated (block 38) to seek the head toward the target data track. The seek operation includes integrating a first state of the servo control system and limiting an output range of the integrating (block 40). The output range of the integrating is increased during the seek operation (block 46), for example, if an error occurs (block 44) during the seek operation.

In the embodiment of FIG. 3A, the disk 28 comprises embedded servo sectors $48_0$-$48_N$ that define the plurality of data tracks 30. The control circuitry 34 processes a read signal 50 emanating from the head 32 to demodulate the servo sectors $48_0$-$48_N$ and generate a position error signal (PES) representing an error between the actual position of the head and a target position relative to a target track. The control circuitry 34 filters the PES using a suitable compensation filter to generate a control signal 52 applied to a voice coil motor (VCM) 54 which rotates an actuator arm 56 about a pivot in order to actuate the head 32 radially over the disk in a direction that reduces the PES. The servo sectors $48_0$-$48_N$ may comprise any suitable position information, such as a track address for coarse positioning and servo bursts for fine positioning. The servo bursts may comprise any suitable servo burst pattern, such as an amplitude based servo burst pattern (A,B,C,D quadrature pattern) shown in FIG. 1, or a phase based servo burst pattern (N,Q servo bursts).

Figure 4:
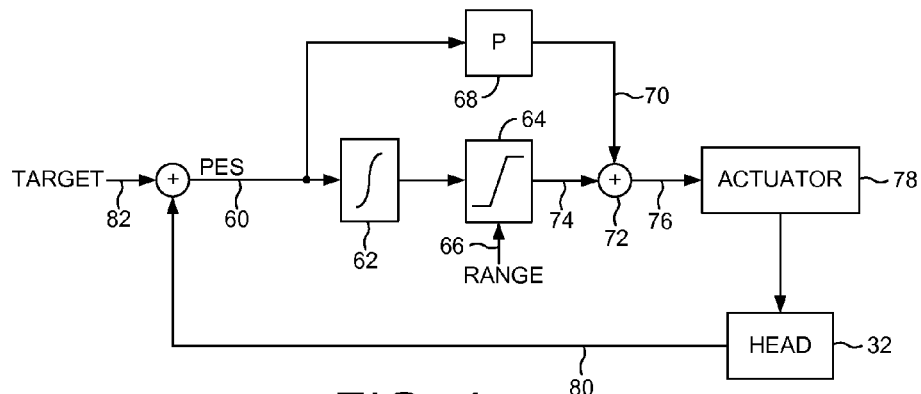
FIG. 4 shows an embodiment of the present invention wherein the servo control system comprises a proportional/integral compensator.

In one embodiment, the first servo state 60 in FIG. 3B comprises a position error signal (PES) representing a difference between a target radial location of the head and a measured radial location of the head. An integrator 62 integrates the PES 60, and the output range of the integrator 62 is limited 64 (both positive and negative amplitudes) based on a programmable range 66. In one embodiment, the integrator 62 forms part of a servo compensator, and in an embodiment shown in FIG. 4, the integrator 62 is combined with a proportional term 68 to form a proportional/integral (PI) servo compensator. The output 70 of the proportional term 68 is added 72 to the output 74 of the integrator limiter 64 to generate a control signal 76 applied to an actuator 78 (e.g., VCM 54 and/or a microactuator not shown). The actuator 78 moves the head 32 in response to the control signal 76, and the location of the head 80 is measured (e.g., by reading the servo sectors $48_0$-$48_N$). The measured location of the head 80 is subtracted from a target location 82 to generate the PES 60. Although the embodiment of FIG. 4 shows the servo control system comprising a PI servo compensator, the servo control system may comprise any suitable algorithm, such as a proportional/integral/derivative (PID) compensator, as well as state space control, adaptive control, iterative learning, feed-forward compensation, etc. In addition, the integrator 62 and range limiter 64 may be implemented within any suitable component of the servo control algorithm (instead of or in addition to the integrator of a PI or PID controller).

In one embodiment, limiting the output range of the integrator helps prevent integrator windup which can lead to excessive overshoot during the seek operation. However, limiting the output range of the integrator may also prevent the servo control system from successfully completing a seek operation. For example, if a bias force applied to the actuator arm 56 is not properly compensated, it may prevent the seek operation from completing successfully. Accordingly, in one embodiment the output range of the integrating is increased during the seek operation in order to help ensure the seek operation completes successfully.

Figure 5A:
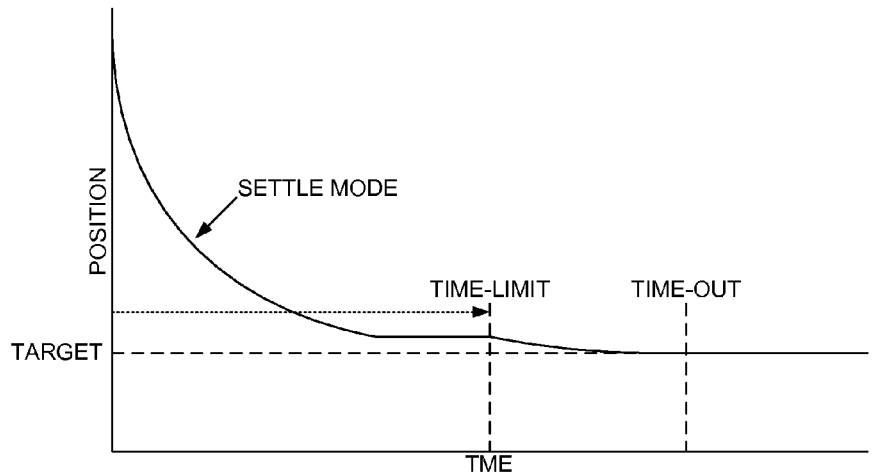
FIG. 5A illustrates an embodiment of the present invention wherein the output range of the integrator is increased when a time-limit is exceeded relative to a beginning of the settle mode.

FIG. 5A illustrates an example of the present invention wherein if the seek operation does not successfully complete when a time-limit expires, the output range of the integrating is increased. For example, if the bias force of the flex circuit is not properly compensated, the seek operation will essentially stall before successfully completing as shown in FIG. 5A. When the time-limit expires, the output range of the integrating is increased which causes the seek operation to complete successfully before reaching a time-out limit.

In the embodiment of FIG. 5A, the time-limit used to increase the output range of the integrating is set relative to a beginning of a settle mode near the end of the seek operation. That is, when the servo control system transitions into the settle mode, a timer is started. If the timer reaches the time-limit before the seek operation completes, the output range of the integrating is increased which will typically help the seek operation to finish before the timer reaches the time-out limit.

Figure 5B:
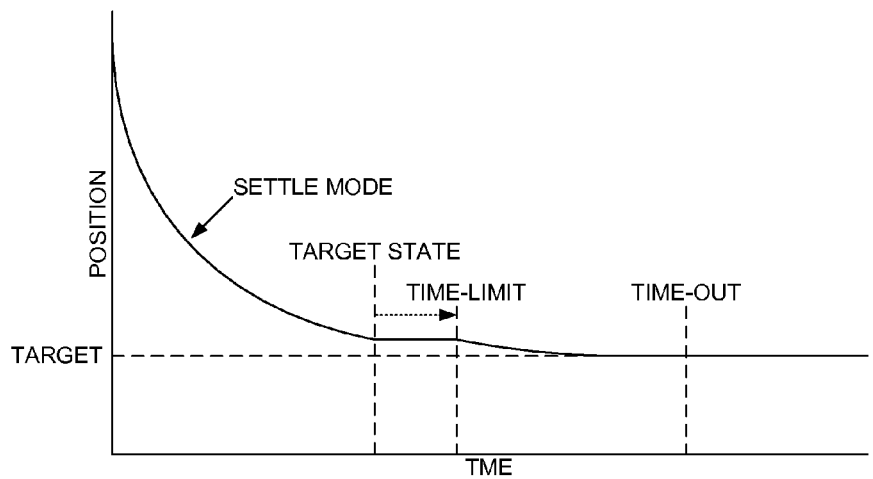
FIG. 5B illustrates an embodiment of the present invention wherein the output range of the integrator is increased when a time-limit is exceeded relative to when a state of the servo system exceeds a threshold.

FIG. 5B shows an alternative embodiment of the present invention wherein the time-limit is set relative to a state of the servo control system. In the example of FIG. 5B, the time-limit is set relative to when the PES falls below a predetermined threshold. In another embodiment, the time-limit may be set relative to a different servo state, such as when the velocity of the head falls below a predetermined threshold. In one embodiment, setting the time-limit relative to when a servo state reaches a threshold helps prevent the aforementioned integrator windup by delaying the increase in the integrator output range limit until the servo control system has settled sufficiently.

Figure 6:
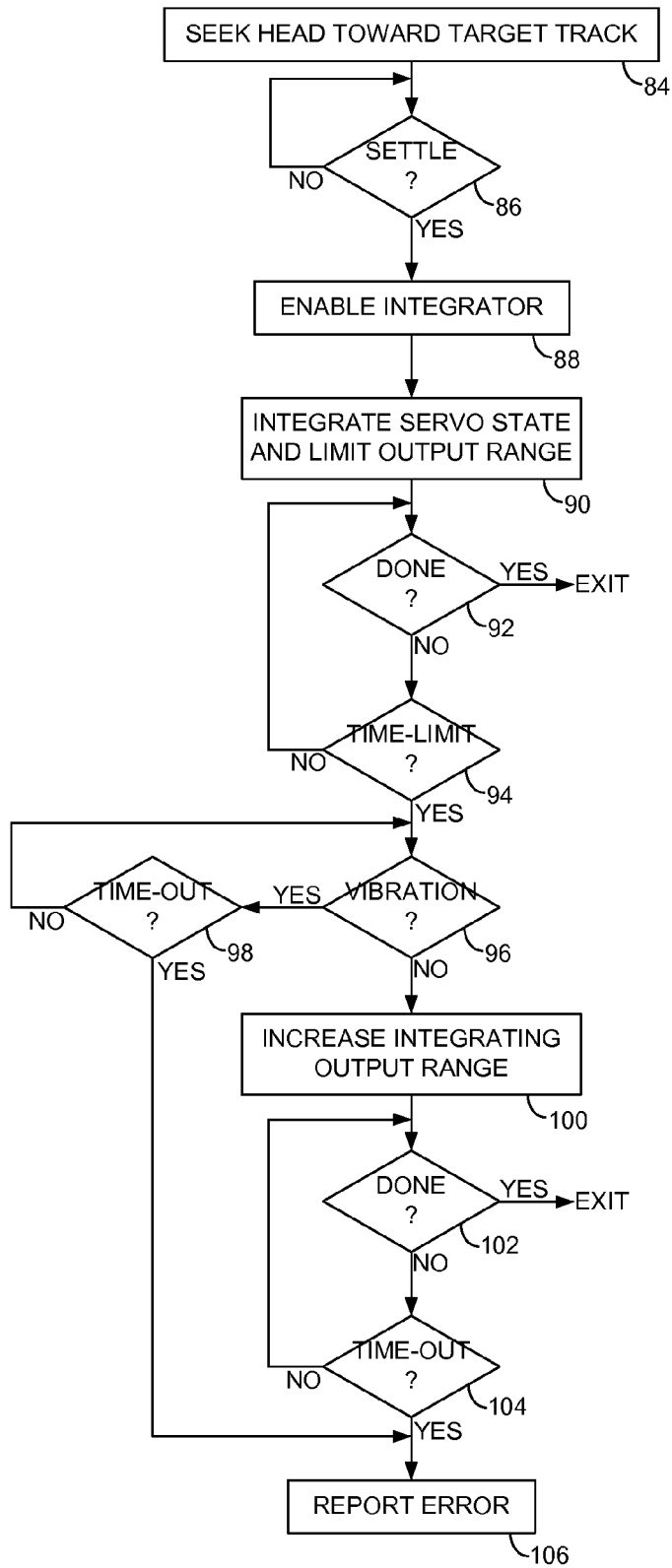
FIG. 6 is a flow diagram according to an embodiment of the present invention wherein increasing the output range of the integrator is delayed until a vibration subsides.

FIG. 6 is a flow diagram according to an embodiment of the present invention wherein when an access command to access a target data track is received, a seek operation is initiated (block 84) to seek the head toward the target data track with the integrator disabled. When the head approaches the target track, the servo control system transitions into the settle mode (block 86) and enables the integrator (block 88). A servo state is integrated and the output range of the integrating is limited (block 90) during the settle mode. If the seek operation completes successfully (block 92), then the flow diagram exits normally. Otherwise, if a time-limit expires during the settle mode (block 94), a determination is made as to whether a vibration is affecting the servo control system (block 96). For example, one or more states of the servo control system are evaluated, and/or a suitable shock sensor is evaluated to determine whether there is a vibration condition. When a vibration is detected at block 96, the control circuitry waits for the vibration to subside. If a time-out is reached (block 98) while waiting for the vibration to subside, then an error is reported (block 106). If the vibration subsides at block 96, then the output range of the integrating is increased (block 100) and the settle mode continues. If the seek operation completes successfully (block 102), then the flow diagram exits normally, but if the time-out is reached (block 104), an error is reported (block 106). In one embodiment, waiting for a vibration to subside before increasing the output range of the integrator may help prevent the aforementioned integrator windup and overshoot problem.

Figure 7:
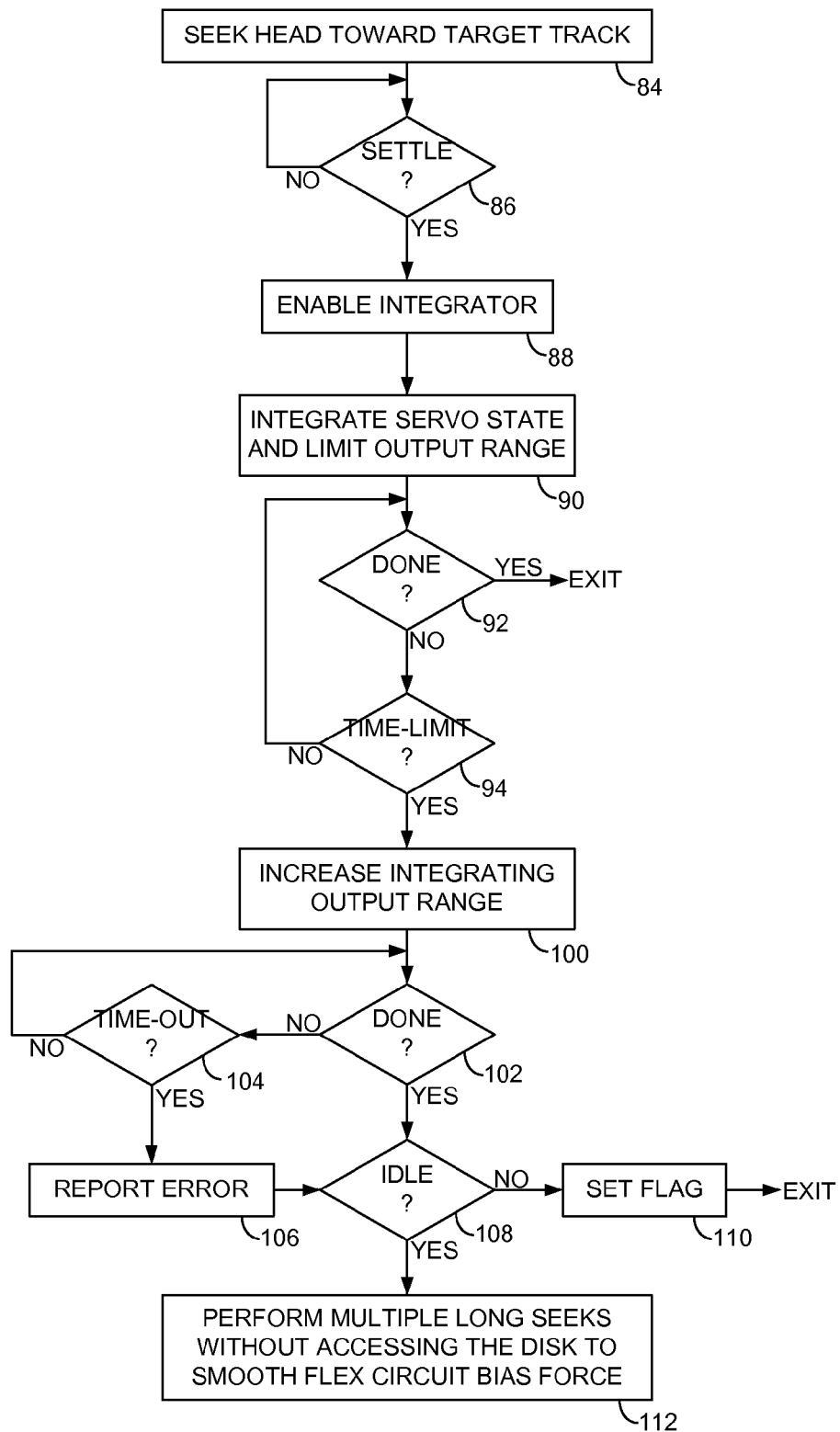
FIG. 7 is a flow diagram according to an embodiment of the preset invention wherein when an increase in the output range of the integrator is needed to complete a seek operation, multiple long seeks are executed without accessing the disk to smoothen a bias force applied by the actuator arm pivot bearing.

FIG. 7 is a flow diagram according to an embodiment of the present invention which is a variation on the flow diagram of FIG. 6. If it becomes necessary to increase the output range of the integrator at block 100, when the current seek operation terminates (successfully or unsuccessfully), a determination is made as to whether the disk drive is idle (e.g., no pending access commands). If the disk drive is not idle (block 108), then a flag is set (block 110). If the disk drive is idle at block 108, or if the flag is set when the disk drive becomes idle, then the control circuitry performs a plurality of long seeks each over at least one hundred data tracks without accessing the disk in order to smoothen a bias force and improve a likelihood subsequent seek operations will complete successfully within the time-limit. In one embodiment, performing several long seeks may help reduce actuator ball and race burnishing as well as redistribute the lubricant within the pivot bearing of the actuator arm, and thereby smoothen the bias force applied to the actuator arm.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
   a disk comprising a plurality of data tracks;
   a head; and
   control circuitry comprising a servo control system operable to actuate the head over the disk, wherein the control circuitry operable to:
   receive an access command to access a target data track;
   initiate a seek operation to seek the head toward the target data track, wherein the seek operation includes integrating a first state of the servo control system and limiting an output range of the integrating; and
   increase the output range of the integrating when a time-limit expires without successfully completing the seek operation.

2. The disk drive as recited in claim 1, wherein the control circuitry is further operable to increase the output range of the integrating during a settle mode of the seek operation.

3. The disk drive as recited in claim 2, wherein the control circuitry is further operable to enable the integrating during the settle mode.

4. The disk drive as recited in claim 2, wherein the control circuitry is further operable to set the time-limit relative to a beginning of the settle mode.

5. The disk drive as recited in claim 1, wherein the control circuitry is further operable to set the time-limit relative to a second state of the servo control system.

6. The disk drive as recited in claim 5, wherein the second state comprises a position error signal representing a difference between a target radial location of the head and a measured radial location of the head.

7. The disk drive as recited in claim 5, wherein the second state comprises a velocity of the head.

8. The disk drive as recited in claim 1, wherein the first state comprises a position error signal representing a difference between a target radial location of the head and a measured radial location of the head.

9. The disk drive as recited in claim 1, wherein the control circuitry is further operable to:
   detect a vibration level of the disk drive; and
   delay increasing the output range of the integrating until the vibration level is below a threshold.

10. The disk drive as recited in claim 2, wherein in response to the time-limit expiring during the settle mode, the control circuitry is further operable to perform a plurality of long seeks each over at least one hundred data tracks without accessing the disk in order to smoothen a bias force and improve a likelihood subsequent seek operations will complete successfully within the time-limit.

11. A method of operating a disk drive, the disk drive comprising a disk comprising a plurality of data tracks, a head, and control circuitry including a servo control system operable to actuate the head over the disk, the method comprising:
    receiving an access command to access a target data track;
    initiating a seek operation to seek the head toward the target data track, wherein the seek operation includes integrating a first state of the servo control system and limiting an output range of the integrating; and
    increasing the output range of the integrating when a time-limit expires without successfully completing the seek operation.

12. The method as recited in claim 11, further comprising increasing the output range of the integrating during a settle mode of the seek operation.

13. The method as recited in claim 12, further comprising enabling the integrating during the settle mode.

14. The method as recited in claim 12, further comprising setting the time-limit relative to a beginning of the settle mode.

15. The method as recited in claim 12, further comprising setting the time-limit relative to a second state of the servo control system.

16. The method as recited in claim 15, wherein the second state comprises a position error signal representing a difference between a target radial location of the head and a measured radial location of the head.

17. The method as recited in claim 15, wherein the second state comprises a velocity of the head.

18. The method as recited in claim 12, wherein the first state comprises a position error signal representing a difference between a target radial location of the head and a measured radial location of the head.

19. The method as recited in claim 12, further comprising:
    detecting a vibration level of the disk drive; and
    delaying increasing the output range of the integrating until the vibration level is below a threshold.

20. The method as recited in claim 12, wherein in response to the time-limit expiring during the settle mode, further comprising performing a plurality of long seeks each over at least one hundred data tracks without accessing the disk in order to smoothen a bias force and improve a likelihood subsequent seek operations will complete successfully within the time-limit.

* * * * *